United States Patent Office 3,005,006
Patented Oct. 17, 1961

3,005,006
NEUTRAL PHOSPHOROTHIOATE ESTER COMPOSITIONS AND METHOD OF PREPARATION THEREOF
Allen F. Millikan, Crystal Lake, and Gifford W. Crosby, River Forest, Ill., assignors to The Pure Oil Company, Chicago, Ill., a corporation of Ohio
No Drawing. Filed Dec. 12, 1957, Ser. No. 702,256
27 Claims. (Cl. 260—461)

This invention relates to new and useful improvements in phosphorothioate ester compositions, to methods of making the same, and to improved lubricant compositions containing a small amount of the ester sufficient to enhance the antiwear properties thereof.

In particular, this invention is based upon the discovery that neutral phosphorothioate esters having sulfur/phosphorus ratios of greater than about 2/1 can be prepared by the reaction of a dialkyl or diaryl phosphorodithioic acid with benzyl alcohol, or derivatives of benzyl alcohol containing functional groups which are inert to the acid ester. The reaction is preferably carried out at a temperature of 20°–160° C. and produces a mixture of reaction products which settles into two phases. The upper phase is an oil-soluble, complex, phosphorothioate ester which is substantially neutral and has a sulfur/phosphorus ratio of greater than about 2/1. When small amounts of these neutral esters are incorporated in a mineral lubricating oil, the lubricant thus produced has exceptional and unexpected antiwear properties.

Diesters of phosphorodithioic acids are commonly prepared by reacting an alcohol or phenol with phosphorus pentasulfide in a 4 to 1 mol ratio. Products of this reaction may be represented by the formula, $(RO)_2P(S)SH$, where R may be alkyl, aryl, alkylaryl or arylalkyl. The literature indicates that in only one case, the reaction of phosphorus pentasulfide and methanol, does the reaction proceed beyond the formation of a diester and produce a trialkyl phosphorodithioate. In Norman, Le Suer, and Mastin, JACS, 74, 161, 1952, there are reported the results of a study in which six possible methods of preparing neutral triesters of phosphorodithioic acids were reviewed and tried. Of the six methods, the following are pertinent to our invention:

(A) 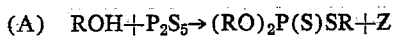  $ROH + P_2S_5 \rightarrow (RO)_2P(S)SR + Z$ (Z is an unidentified acidic material)

(C) 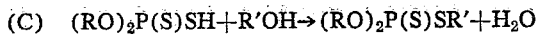  $(RO)_2P(S)SH + R'OH \rightarrow (RO)_2P(S)SR' + H_2O$

In investigating method "A," the authors reported that only the trimethyl phosphorodithioate could be prepared. In reporting on method "C," the authors stated: "The direct esterification method was unsuccessful in all attempts. Decomposition of the reactants resulted in a complex mixture of products from which no pure product could be isolated. No neutral ester was obtained." These authors then reported that the only practical method of producing neutral triesters of phosphorodithioic acid is by the reaction of a sodium salt of a dialkyl phosphorodithioic acid with an alkyl halide, or by the reaction of a dialkyl phosphorodithioic acid with an olefinic hydrocarbon.

It is, therefore, one object of this invention to provide a new and improved method for preparation of neutral phosphorothioate esters.

Another object of this invention is to provide an improved lubricating oil composition having superior antiwear properties.

A feature of this invention is the provision of an improved method for the preparation of neutral phosphorothioate esters having sulfur-to-phosphorus ratios of greater than about 2/1 by the reaction of benzyl alcohol, or a derivative thereof, with a dialkyl or diaryl phosphorodithioic acid.

Another feature of this invention is the provision of a process for the preparation of neutral phosphorothioate esters having sulfur-to-phosphorus ratios of greater than about 2/1 by reaction of benzyl alcohol, or a derivative thereof, and a dialkyl or diaryl phosphorothioic acid, followed by a settling of the reaction products and recovery of the upper oil-soluble phase.

Still another feature of this invention is the provision of a process for the preparation of neutral phosphorothioate esters by reaction of benzyl alcohol, or a derivative thereof, and a dialkyl or diaryl phosphorodithioic acid, followed by water washing the reaction mixture to recover as a residue an oil-soluble ester.

A further feature of this invention is the provision of an improved lubricating oil composition containing a small amount of phosphorothioate ester produced by reaction of benzyl alcohol, or a derivative thereof, with a dialkyl or diaryl phosphorodithioic acid, said ester composition being present in an amount sufficient to enhance substantially the antiwear properties of the lubricant.

Other objects and features of this invention will become apparent from time to time throughout the specification and claims as hereinafter related.

This invention is based upon the discovery that, while substantially all alcohols and phenols reported in the literature do not react with dialkyl or diaryl phosphorodithioic acids to produce neutral triesters, it is possible to carry out the reaction of benzyl alcohol or a substituted benzyl alcohol with dialkyl or diaryl phosphorodithioic acids. This reaction of benzyl alcohol and its derivatives with dialkyl or diaryl phosphorodithioic acids is unusual in that it apparently results in the production of the desired neutral ester of S/P ratio greater than 2/1 and a highly acidic, water-soluble by-product. When the product and by-product are separated, by gravity separation in some cases and by water-washing and/or centrifuging in other cases, the water-insoluble phase is recovered as a neutral phosphorothioate ester composition having unusual properties. This product has a sulfur-to-phosphorus ratio greater than about 2/1, usually in the range of 2–4/1, and is substantially neutral. It apparently is a mixture of phosphorotrithioates and phosphorotetrathioates and condensation products or polymers thereof. This invention is further based upon the discovery that the neutral esters which are produced as just described, when incorporated in a lubricating oil, enhance the antiwear properties of the lubricating oil to an unexpected and unpredictable degree. This invention will be more fully illustrated by the following specific examples:

EXAMPLE I

A 250 ml. flask was charged with 37 g. (0.20 mole) of O,O'-diethyl phosphorodithioic acid and 67.8 g. (0.63 mole) of benzyl alcohol and heated over steam, with stirring. A gentle stream of nitrogen gas bubbled through the reaction mass to remove any gaseous or low-boiling by-products. The reaction was continued at 90° to 95° C. for 20 hours, during which time hydrogen sulfide was evolved continuously. The temperature of the reaction is not critical within the range of about 20° to 160° C., except for variations in the time required for carrying out the reaction. At lower temperatures the reaction becomes excessively slow. At temperatures above 160° C. the reaction is highly exothermic and difficult to control. By the end of 20 hours of reaction at 90° to 95° C., the reaction product had formed as two liquid phases which separated into two distinct layers. The upper phase was a mobile liquid, weighing 27 g. and was substantially neutral (having an acid number less than 7). This product was more soluble in oil than the O,O'-diethyl phosphorodithioic acid from which it was formed, contained 4.6% phosphorus and 15.6% sulfur, and had a S/P ratio of 3.3. The lower phase of the reaction product had the appearance of a polymeric material, was water-soluble, and oil-insoluble, and had an acid number greater than 325. This material contained 10.2% phosphorus and 6.8% sulfur, or a S/P ratio of 0.64. Simple esterification of the phosphorodithioic acid with benzyl alcohol would give a neutral product with a sulfur/phosphorus ratio of 2 to 1. The experimentally obtained ratio of 3.3 to 1 is indicative of disproportionation and formation of triesters of phosphorotrithioic acid and phosphorotetrathioic acid, together with condensation and polymerization products thereof. On the basis of the phosphorus content of the O,O'-diethyl phosphorodithioic acid charged, the yield of combined phosphorus in our new product was about 19%.

EXAMPLE II

O,O'-diphenyl phosphorodithioic acid was prepared by charging 442 g. (4.70 moles) of phenol, 443 g. of 85 vis., 100 V.I. neutral oil, and 450 ml. of toluene to a two-liter flask equipped with motor-driven stirrer and thermometer, and mounted over steam. As the mixture was stirred and heated (90–95° C.), 260 g. (1.17 moles) of phosphorus pentasulfide were added over a five-minute period. After sixteen hours, the reaction appeared to be complete as evidenced by clearing of the solution. Acidity measurements indicated that 2.6 moles of acid had been formed (compared with 2.4 moles in theory).

Fifty-five-hundredths mole of the O.O'-diphenyl phosphorodithioic acid produced above, 238 g. (2.20 mole) of benzyl alcohol, and 200 ml. of toluene were charged to a liter flask equipped with motor-driven stirrer and thermometer, and mounted over steam. The reaction mixture was stirred for 35 hours at 90–95° C. At the end of this time, the reaction was stopped, and the product separated into three phases. The upper phase appeared to be largely neutral oil. The middle phase (338 g.) had an acid content of 0.32 mole (as indicated by acid number). The lower phase (10 g.) was water-soluble and of high acidity. A portion of the middle phase was water-washed. The resulting emulsion was resolved by centrifuging. The final product was an oily liquid, heavier than water which after water-washing has an S/P ratio of about 2/1.

EXAMPLE III

O,O'-di-2-ethylhexyl phosphorodithioic acid was prepared by stirring 520.2 g. (4.0 moles) of 2-ethylhexanol, 522.1 g. of 85 vis., 100 V.I. neutral oil, 500 ml. of toluene, and 222.3 g. (1.0 mole) of phosphorus pentasulfide at 90° C. for 4 hours. Reaction was complete at the end of this time, as evidenced by the disappearance of solids. The product was filtered, the filtrate weighing 1610 g. Acidity measurements indicated that 1.96 moles of acid had been formed (compared to a theoretical yield of 2.0 mole). The analysis of the product was: theory—3.9 wt. percent P, 8.0 wt. percent S; found—3.8 wt. percent P, 7.8 wt. percent S.

One hundred sixty-four and four-tenths grams (0.204 mole) of the acid so prepared, and 110.5 g. (1.02 moles) of benzyl alcohol were charged to a one-liter flask equipped with thermometer and motor-driven stirrer. The flask was partially immersed in an oil bath heated over a hot plate. The reaction mixture was stirred for 6.5 hours at 130–150° C. An attempt to bring about phase separation by chilling was unsuccessful. A portion of the product was water-washed, and the resulting emulsion was resolved by centrifuging, yielding an oil-soluble product of reduced acidity and increased sulfur/phosphorus ratio. A portion of this product was in turn water-washed and the resulting emulsion again resolved by centrifuging. The oil-soluble material was found to be further reduced in acidity, and of increased S/P ratio. The product from the second water-washing weighed 161.1 g. and had an S/P ratio of 2.8. Continued water-washing would probably reduce the acidity to zero and further increase the S/P ratio. A companion experiment established that water-washing had little effect on O,O'-di-2-ethylhexyl phosphorodithioic acid.

EXAMPLE IV

O,O'-di-n-butyl phosphorodithioic acid was prepared by charging 296.5 g. (4.0 moles) of n-butyl alcohol and 360 ml. of toluene to a one-liter flask equipped with a motor-driven stirrer and thermometer. The flask was heated with a steam bath. Over a thirty-minute period, 222.3 g. (1.0 mole) of phosphorus pentasulfide was added to the reaction mixture as it was stirred and heated (90–95° C.), and vigorous evolution of hydrogen sulfide occurred. After four hours of reaction at 90–95° C., all solids had disappeared and it was considered that the reaction was complete. The product was filtered, the filtrate weighing 691 g. The product had an acid number of 142, indicating that 1.75 moles of acid had been formed, in comparison with 2.0 moles in theory. Analysis of product: theory—9.0 wt. percent P, 18.6 wt. percent S; found—9.0 wt. percent P, 17.3 wt. percent S.

Three hundred twenty-one grams (0.93 mole according to theory; 0.81 mole according to acid number) of the O,O'-di-n-butyl phosphorodithioic acid and 259 g. (2.12 moles) of DL-alpha-methyl benzyl alcohol were charged to a one-liter flask equipped with motor-driven stirrer and thermometer, and mounted over steam. The reaction mixture was stirred for twenty hours at 90°–95° C. At the end of this time, the acidity of the product was essentially the same as that of the charge (as measured by acid number). The product was water-washed and separated from the wash water by centrifuging. The washed product was oil-soluble, weighed 378 g. and had an acid content of 0.23 mole, a considerable reduction from the 0.81 mole of acid in the charge (also measured by acid number). The product analyzed: 11.5 wt. percent S and 5.1 wt. percent P to show a S/P ratio of 2.2/1.

EXAMPLE V

One hundred fifty-six grams (0.45 mole in theory, 0.40 mole by acid number) of O,O'-di-n-butyl phosphorodithioic acid, as prepared in Example IV, and 197.6 g. (1.618 moles) of tolylcarbinol (ring-substituted methylbenzyl alcohol) were charged to a liter flask equipped with motor-driven stirrer and thermometer, and mounted over steam. The reaction mixture was stirred for eighteen hours at 90–95° C. At the end of this time, the product's acidity was somewhat higher (0.48 mole) than that of the charge (0.40 mole), as determined by acid number. The product was water-washed, and the oil-soluble product phase separated by centrifuging. The washed product weighed 235 g. and had an acid content of 0.13 mole (by acid number). The product analyzed 9.1 wt. percent S and 3.6 wt. percent P to show a S/P ratio of 2.4/1.

EXAMPLE VI

O,O'-dioctadecyl phosphorodithioic acid is prepared by reaction of octadecanol with phosphorus pentasulfide following the procedure of Example III. When the O,O'-dioctadecyl phosphorodithioic acid is reacted with benzyl alcohol as in Example III the product which is obtained after water-washing is oil-soluble, of low acidity, and has a S/P ratio greater than 2.

EXAMPLE VII

O,O'-di-2-ethylhexyl phosphorodithioic acid is prepared as in Example III. The O,O'-di-2-ethylhexyl phosphorodithioic acid is reacted with hexadecylphenyl carbinol for 7 hrs. at 150° C. After water-washing, an oil-soluble product is obtained which has a low acid number and a S/P ratio greater than 2.

EXAMPLE VIII

O,O'-di-n-butyl phosphorodithioic acid is prepared as in Example IV and reacted with α-decylbenzyl alcohol for 35 hrs. at 130°–150° C. The product, after water-washing, is an oil-soluble oily liquid which has a low acid number and a S/P ratio greater than 2.

EXAMPLE IX

O,O'-di-n-butyl phosphorodithioic acid is prepared as in Example III and reacted with α-chlorobenzyl alcohol for 8 hrs. at 120°–150° C. After water-washing, the product recovered is an oily, oil-soluble liquid having a low acid number and a S/P ratio greater than 2/1.

This process is generally operative for the formation of neutral esters by the reaction of benzyl alcohol and derivatives (either ring-substituted or alpha-substituted derivatives) thereof with any alkyl or aryl diester of phosphorodithioic acid. In carrying out this reaction, benzyl alcohol, or any derivative of benzyl alcohol containing functional groups which do not react with the acid ester may be used. Examples of these are alkyl- and aryl-substituted benzyl alcohols, such as ethylbenzyl alcohol, methylbenzyl alcohol, n-propylbenzyl alcohol, decylbenzyl alcohol, octadecylbenzyl alcohol, phenylbenzyl alcohol, and tolylbenzyl alcohol; halogenated benzyl alcohols, such as chlorobenzyl alcohol, dichlorobenzyl alcohol, bromobenzyl alcohol, and dibromobenzyl alcohol; and other benzyl alcohols containing inert substituents, such as nitrobenzyl alcohol, methoxybenzyl alcohol, and acetylbenzyl alcohol. In these substituted benzyl alcohols the substituents may be on the ring or hydrocarbon groups may be in the alpha position. Acid esters which may be reacted with the benzyl alcohol or derivative include O,O'-dimethyl phosphorodithioic acid, O,O'-dipropyl phosphorodithioic acid, O,O'-dioctyl phosphorodithioic acid, O,O'-dioctadecyl phosphorodithioic acid, O,O'-dibenzyl phosphorodithioic acid, O,O'-diphenyl phosphorodithioic acid, O,O'-dinaphthyl phosphorothioic acid, and O,O'-di(hexadecylphenyl) phosphorodithioic acid. In carrying out this process the only restriction on the molecular size of either of the reactants is that at least one of the reactants must be liquid in the temperature range from 20° to 160° C., and the functional group on the benzyl alcohol, if a substituted alcohol is used, must be inert toward the acid ester. In cases where the product and by-product are miscible, the by-product can be removed by water-washing.

The phosphorothioate ester compositions which are produced by this process have been found to exhibit unexpectedly superior properties when used as antiwear additives in lubricating oil compositions. These ester compositions (the neutral oily phase of the reaction product), when added to lubricating oils to produce a phosphorus concentration in the oil in the range of 0.005–1.0%, have been found to reduce wear of moving parts lubricated therewith to an unexpected degree. To demonstrate the superiority of lubricating compositions including small amounts of the products of this process, a number of lubricant compositions were prepared using a mineral lubricating oil base and various additives to demonstrate the antiwear properties thereof. These oil compositions were tested in a four-ball EP test apparatus under a 200 kg. load, at 1800 r.p.m., for 5 minutes at room temperature. Under these conditions of load, the balls are elastically deformed at the point of contact to produce a circular area of contact, having a diameter of 0.236 mm., between each of the balls. The measure of resistance of an oil to wear (i.e., the antiwear properties thereof) is the ability of the oil to prevent formation of a wear scar having a diameter substantially greater than the initial diameter of the circular area of contact or elastic indentation.

To illustrate the significance of this wear test, a detergent lubricating oil was used consisting of 83.1 wt. percent of a solvent-refined 170 vis., 100 V.I. neutral oil, 4.8 wt. percent extract from the phenol extraction of 85 vis., 100 V.I. neutral oil stock, 5.7 wt. percent barium phenol sulfide-calcium sulfonate, and 6.4 wt. percent Acryloid 618 (acrylic polymer manufactured by Rohm and Haas, Inc.). This lubricating oil composition was evaluated for antiwear properties without any additive, and with various phosphorus- and sulfur-containing compounds added in concentration such that 0.1 wt. percent phosphorus was contained in each blend. In evaluating the performance of antiwear additives in lubricating oil compositions, various oil compositions were measured in the four-ball test apparatus and the size of the wear scars compared. Since the wear scar can never be smaller in diameter than the elastic indentation, the comparison of wear using different lubricants is best made by measuring the increase in scar diameter over the diameter of elastic indentation. Oils which have superior antiwear properties will, of course, produce scars having smaller increase in diameter than oils which do not provide wear protection. The results of several tests are shown in Table I as follows:

Table I

| Additive (In an amount sufficient to produce phosphorus concentration of 0.1%) | Average increase in scar diameter over initial diameter of elastic indentation, mm.×10³ |
|---|---|
| None | 44 |
| O,O-diamyl phosphorodithioic acid | 48 |
| 1-phenylethyl O,O'-diamyl phosphorodithioate | 53 |
| Commercial zinc dialkyl phosphorodithioate composition | 37 |
| Product of Example I | 25 |

The above data show quite clearly that the neutral phosphorothioate ester compositions produced by our process are exceptionally good antiwear additives for lubricating oil compositions. These esters are superior to several commercial antiwear additives and are easy to prepare. When these additives are added to mineral lubricating oils without any other additive present, the improvement in antiwear properties is proportionately as great or greater as that indicated in Table I.

The products of Examples IV and V were tested as antiwear agents in two test vehicles, (1) extract from the manufacture of 85 vis., 100 V.I. neutral, and (2) 170 vis., 100 V.I. neutral. The results of these tests are presented below in Tables II and III. The additive was present in such concentration as to provide 0.1 wt. percent P in the blend compositions.

Table II

[Base oil: Extract from manufacture of 85 vis., 100 V.I. neutral]

|  | Average increase in scar diameter over initial diameter of indentation, mm.×10³ |
|---|---|
| No additive | 287 |
| Product of Example IV | 68 |
| Product of Example V | 70 |

Table III

[Base oil: 170 vis., 100 V.I. neutral]

|  | Average increase in scar diameter over initial diameter of indentation, mm.×10³ |
|---|---|
| No additive | 144 |
| Product of Example IV | 115 |
| Product of Example V | 93 |

The data in Tables II and III show the products of Examples IV and V have antiwear activity.

The products of Examples II, III, VI, VII, VIII, and IX also show similar wear protection when incorporated in a lubricating oil composition.

While there has been described several specific embodiments of this invention, it should be understood that within the scope of the appended claims this invention may be practiced otherwise than as specifically described.

What is claimed is:

1. A method of preparing neutral phosphorothioate esters by reaction of an acid ester, $(RO)_2P(S)SH$, where R is a hydrocarbon radical, with an alcohol of the group consisting of benzyl alcohol and derivatives of benzyl alcohol containing functional groups which are inert to said acid ester, at a temperature of 20° to 160° C.

2. A method according to claim 1 in which said alcohol is benzyl alcohol.

3. A method according to claim 1 in which the alcohol is an alkylphenyl carbinol.

4. A method according to claim 1 in which the reaction is carried out in an inert solvent.

5. A neutral phosphorothioate ester composition having a sulfur/phosphorus ratio greater than 2, prepared in accordance with claim 1, characterized by solubility in hydrocarbons and by insolubility in water.

6. A method according to claim 1 in which the reaction product is resolved into two phases and the water-insoluble phase is recovered as a neutral oil-soluble ester having a sulfur/phosphorus ratio greater than 2.

7. A method according to claim 6 in which the neutral ester is purified by water-washing followed by centrifuging.

8. A method according to claim 1 in which R is of the group consisting of ethyl, butyl, 2-ethylhexyl, octadecyl, and phenyl.

9. A neutral phosphorothioate ester composition having a sulfur/phosphorus ratio greater than 2, prepared in accordance with claim 8, characterized by solubility in hydrocarbons and by insolubility in water.

10. A method according to claim 1 in which the alcohol is an alpha-alkylbenzyl alcohol.

11. A neutral phosphorothioate ester composition having a sulfur-phosphorus ratio greater than 2, prepared in accordance with claim 10, characterized by solubility in hydrocarbons and by insolubility in water.

12. A method according to claim 1 in which R is selected from the group consisting of $C_1$-$C_{18}$ aliphatic and aromatic hydrocarbon radicals.

13. A neutral phosphorothioate ester composition having a sulfur/phosphorus ratio greater than 2, prepared in accordance with claim 12, characterized by solubility in hydrocarbons and by insolubility in water.

14. A method of preparing neutral phosphorothioate esters having sulfur/phosphorus ratios greater than 2 which comprises reacting O,O'-diethyl phosphorodithioic acid with benzyl alcohol at about 90°–95° C., resolving the reaction product into two phases and recovering the water-insoluble phase as the neutral ester.

15. A neutral phosphorothioate ester composition having a sulfur/phosphorus ratio greater than 2, prepared in accordance with claim 14, characterized by solubility in hydrocarbons and by insolubility in water.

16. A method of preparing neutral phosphorothioate esters having sulfur/phosphorus ratios greater than 2 which comprises reacting O,O'-diphenyl phosphorodithioic acid with benzyl alcohol at about 90°–95° C., resolving the reaction product into two phases and recovering the water-insoluble phase as the neutral ester.

17. A neutral phosphorothioate ester composition having a sulfur/phosphorus ratio greater than 2, prepared in accordance with claim 16, characterized by solubility in hydrocarbons and by insolubility in water.

18. A method of preparing neutral phosphorothioate esters having sulfur/phosphorus ratios greater than 2 which comprises reacting O,O'-di-2-ethylhexyl phosphorodithioic acid with benzyl acohol at about 130°–150° C., resolving the reaction product into two phases and recovering the water-insoluble phase as the neutral ester.

19. A neutral phosphorothioate ester composition having a sulfur/phosphorus ratio greater than 2, prepared in accordance with claim 18, characterized by solubility in hydrocarbons and by insolubility in water.

20. A method of preparing neutral phosphorothioate esters having sulfur/phosphorus ratios greater than 2 which comprises reacting O,O'-di-n-butyl phosphorodithioic acid with DL-alpha-methyl benzyl alcohol at about 90°–95° C., resolving the reaction product into two phases and recovering the water-insoluble phase as the neutral ester.

21. A neutral phosphorothioate ester composition having a sulfur/phosphorus ratio greater than 2, prepared in accordance with claim 20, characterized by solubility in hydrocarbons and by insolubility in water.

22. A method of preparing neutral phosphorothioate esters having S/P ratios greater than 2 which comprises reacting O,O'-di-n-butyl phosphorodithioic acid with tolyl carbinol (ring substituted methylbenzyl alcohol) at about 90°–95° C., resolving the reaction product into two phases and recovering the water-insoluble phase as the neutral ester.

23. A neutral phosphorothioate ester composition having a sulfur/phosphorus ratio greater than 2, prepared in accordance with claim 22, characterized by solubility in hydrocarbons and by insolubility in water.

24. A method of preparing neutral phosphorothioate esters having S/P ratios greater than 2 which comprises reacting dioctadecyl phosphorodithioic acid with benzyl alcohol, resolving the reaction product into two phases and recovering the water-insoluble phase as the neutral ester.

25. A method of preparing neutral phosphorothioate esters having S/P ratios greater than 2 which comprises reacting di-2-ethylhexyl phosphorodithioic acid with hexadecylphenyl carbinol, resolving the reaction product into two phases and recovering the water-insoluble phase as the neutral ester.

26. A method of preparing neutral phosphorothioate esters having S/P ratios greater than 2 which comprises reacting di-n-butyl phosphorodithioic acid with α-decyl benzyl alcohol, resolving the reaction product into two phases and recovering the water-insoluble phase as the neutral ester.

27. A method of preparing neutral phosphorothioate esters having S/P ratios greater than 2 which comprises reacting di-n-butyl phosphorodithioic acid with α-chlorobenzyl alcohol, resolving the reaction product into two phases and recovering the water-insoluble phase as the neutral ester.

References Cited in the file of this patent

UNITED STATES PATENTS

| | | |
|---|---|---|
| 2,266,514 | Romieux et al. | Dec. 16, 1941 |
| 2,565,920 | Hook et al. | Aug. 28, 1951 |
| 2,589,675 | Cook et al. | Mar. 18, 1952 |
| 2,783,204 | McDermott | Feb. 26, 1957 |
| 2,793,224 | Fancher | May 21, 1957 |

OTHER REFERENCES

Schrader: Angewandte Chemie 69, 86–90 (1957).

UNITED STATES PATENT OFFICE

CERTIFICATE OF CORRECTION

Patent No. 3,005,006            October 17, 1961

Allen F. Millikan et al.

It is hereby certified that error appears in the above numbered patent requiring correction and that the said Letters Patent should read as corrected below.

Column 5, line 10, and column 8, lines 56 and 57, for "α-chlorobenzyl", each occurrence, read -- o-chlorobenzyl --.

Signed and sealed this 17th day of April 1962.

(SEAL)
Attest:

ESTON G. JOHNSON

Attesting Officer

DAVID L. LADD

Commissioner of Patents